(12) United States Patent  
Lin

(10) Patent No.: US 8,850,924 B2  
(45) Date of Patent: Oct. 7, 2014

(54) READING RACK FOR USE WITH VEHICLE

(76) Inventor: Chien-Hsing Lin, Santa Barbara, CA (US)

( * ) Notice: Subject to any disclaimer, the term of this patent is extended or adjusted under 35 U.S.C. 154(b) by 0 days.

(21) Appl. No.: 13/041,208

(22) Filed: Mar. 4, 2011

(65) Prior Publication Data

US 2011/0147426 A1    Jun. 23, 2011

Related U.S. Application Data

(62) Division of application No. 11/785,017, filed on Apr. 13, 2007, now abandoned.

(30) Foreign Application Priority Data

Apr. 13, 2006 (TW) .............................. 95113110 A

(51) Int. Cl.
*B60R 7/04* (2006.01)
*B60N 3/00* (2006.01)
*B62D 1/06* (2006.01)

(52) U.S. Cl.
CPC ...................................... *B62D 1/06* (2013.01)
USPC ........................ 74/558; 248/447.1; 224/276

(58) Field of Classification Search
USPC ................. 74/552, 558, 558.5; 224/276, 277; 281/43, 45; 248/441.1, 451, 447.1; 108/44
IPC ......................................................... B60N 3/00
See application file for complete search history.

(56) References Cited

U.S. PATENT DOCUMENTS

| | | | | |
|---|---|---|---|---|
| 1,717,433 A * | 6/1929 | Bragg et al. | ............... | 248/447.2 |
| 1,928,806 A * | 10/1933 | Barcalo | ............................. | 5/639 |
| 2,518,127 A * | 8/1950 | Dobbs | ........................... | 248/454 |
| 3,074,745 A | 1/1963 | Burckhalter | | |
| 3,981,522 A * | 9/1976 | Bloom | ........................... | 281/34 |
| 4,726,607 A * | 2/1988 | White | ............................. | 281/45 |
| 4,729,416 A | 3/1988 | Miller | | |
| 4,995,637 A * | 2/1991 | Muraishi | ...................... | 280/727 |
| 5,385,283 A * | 1/1995 | Shioda | .......................... | 224/276 |
| 5,558,026 A * | 9/1996 | Seibert | ........................... | 108/44 |
| 6,648,193 B2 * | 11/2003 | Rioux | ........................... | 224/276 |
| 2004/0182195 A1 | 9/2004 | Bateman | | |
| 2005/0077334 A1 | 4/2005 | Craig | | |

* cited by examiner

*Primary Examiner* — Thomas Diaz
(74) *Attorney, Agent, or Firm* — Birch, Stewart, Kolasch & Birch, LLP

(57) ABSTRACT

A reading rack for use with vehicles is proposed, comprising: a sheath member adapted to cover the steering wheel of a vehicle; a bottom member adapted to fasten to a surface of the sheath member; and a pressing member coupled with the sheath member and located at an upper surface of the sheath member, thereby allowing pages of an article/book to be placed above the bottom member and underneath the pressing member. The reading rack of the invention further comprises a holding member consisting of a clipping portion and a coupling portion, wherein the clipping portion is adapted to clip an article or book and couple with the surface of the bottom member by the coupling portion, thereby securely fastening a reading article or a piece of paper onto the steering wheel of a vehicle to provide for convenient reading while stopped or quick reference while driving.

7 Claims, 11 Drawing Sheets

READING RACK FOR USE WITH VEHICLE

CROSS-REFERENCES TO RELATED APPLICATIONS

This application is a Divisional of application Ser. No. 11/785,017, filed on Apr. 13, 2007 now abandoned, the entire contents of which are hereby incorporated by reference and for which priority is claimed under 35 U.S.C. §120. This application also claims priority under 35 U.S.C. §119(a) on Patent Application No. 095113110 filed in Taiwan on Apr. 13, 2006, the entire contents of which are hereby incorporated by reference.

BACKGROUND OF THE INVENTION

1. Field of the Invention

The present invention relates to reading racks for use with vehicles, and more particularly, to reading racks that can be fastened onto a steering wheel of a vehicle to provide for convenient reading while a vehicle is stopped or quick visual reference while driving.

2. Description of Related Art

Various reading racks for use with vehicles have been invented to provide for greater comfort and convenience for the drivers to reduce car accidents. Statistically, car accidents are most likely to happen when a driver's attention is distracted while driving by non-driving activities, such as using a cellular phone or referring to a map or guide for directions. As such, use of handheld cellular phones have been prohibitive by law in many advanced countries in an effort to eliminate such accidents caused by distracted drivers.

In the case of a driver holding a map by hand for direction while driving, this inevitably pulls one or both of the driver's hands from the wheel, posing a danger to the safety of the user.

Therefore, it is desirable develop a novel mechanism that allows users/drivers to safely and conveniently refer to reference material while operating or occupying a vehicle.

SUMMARY OF THE INVENTION

A primary objective of the present invention is to provide a reading rack for use with a vehicle that can securely fasten a reading article onto the steering wheel of a vehicle, allowing a driver to conveniently glance at reference material while driving or to read a note, article or book while stopped.

In order to achieve the above and other objectives, the present invention provides a reading rack for use with vehicles, comprising: a sheath member adapted to cover the steering wheel of a vehicle; a bottom member adapted to fasten to a surface of the sheath member; and a pressing member coupled with the sheath member and located at an upper surface of the sheath member, thereby allowing pages of an article/book to be placed above the bottom member and underneath the pressing member.

The reading rack of the invention further comprises a holding member consisting of a clipping portion and a coupling portion, wherein the clipping portion is adapted to clip the article or book and couple with the surface of the bottom member by means of the coupling portion, the bottom member and the coupling portion of the holding member being coupled by a hook-and-loop fastener (Velcro).

Preferably, the sheath member is in a ring shape and can be buckled to the protective cover of the steering wheel; the bottom member is connected to the inner surface of the sheath member; the pressing member can be two spacing elastic cords, buckles, leather belts, elastic rods or sticks that are disposed separately and respectively connected to the outer surface of the sheath member, the pressing member, and the bottom member having a space therebetween so that an open article/book can be placed on the surface of the bottom member and pressed down by the pressing member, allowing thin reading materials such as maps, magazines, and travel guides to be accommodated between the pressing member and the bottom member, thereby clipping an article on the steering wheel for convenient reference. Further, articles of thicker volume can be held by the holding member and coupled to the surface of the bottom member to securely clip such articles on the steering wheel. Moreover, the holding member can be used to hold a little piece of paper or a note that cannot be conveniently pressed by the pressing member, thus coupling the note directly on the surface of the bottom member.

The reading rack for use with vehicles of the invention features clipping reading material on the steering wheel of a vehicle to enable reference glances while driving or reading while stopped, thereby eliminating the inconvenience and hazards incurred from having to hold an article by hand and keeping an appropriate focal distance for the eyes of the user. Accordingly, the present invention offers advantages in that it can help increase the efficiency and safety in driving a car.

BRIEF DESCRIPTION OF DRAWINGS

The reading rack for use with vehicle disclosed by the present invention can be fully understood by reading the following detailed description of the preferred embodiments, with reference made to the accompanying drawings, wherein.

DETAILED DESCRIPTION OF PREFERRED EMBODIMENT

The present invention is described in the following so that one skilled in the pertinent art can easily understand other advantages and effects of the present invention. The present invention may also be implemented and applied according to other embodiments, and the details may be modified based on different views and applications without departing from the spirit of the invention.

Figure 1:
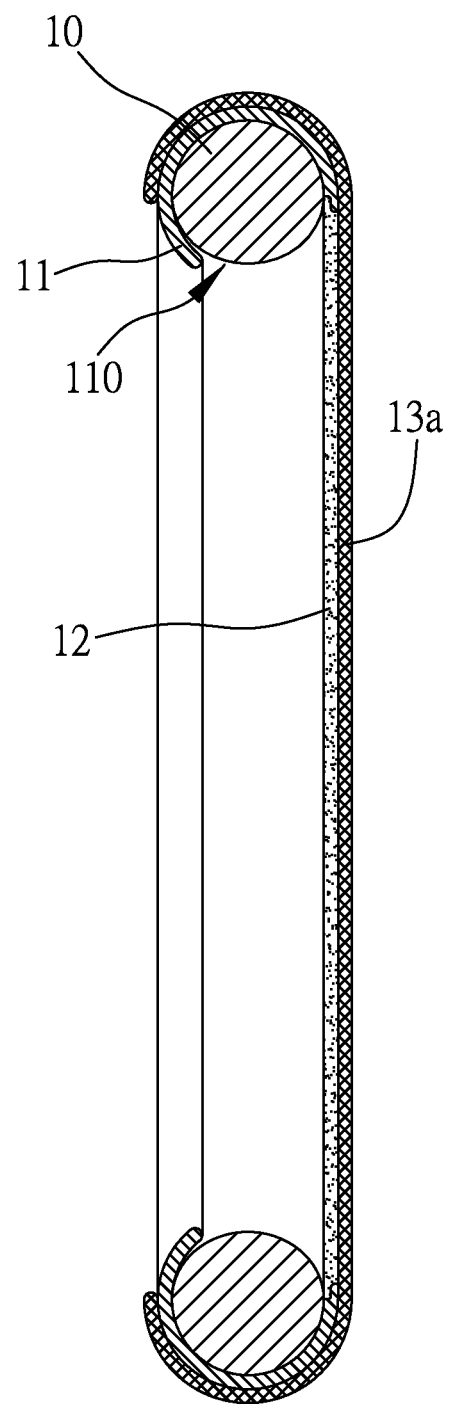
FIG. 1 is a cutaway view of the reading rack for use with vehicles according to the present invention.
Figure 2:
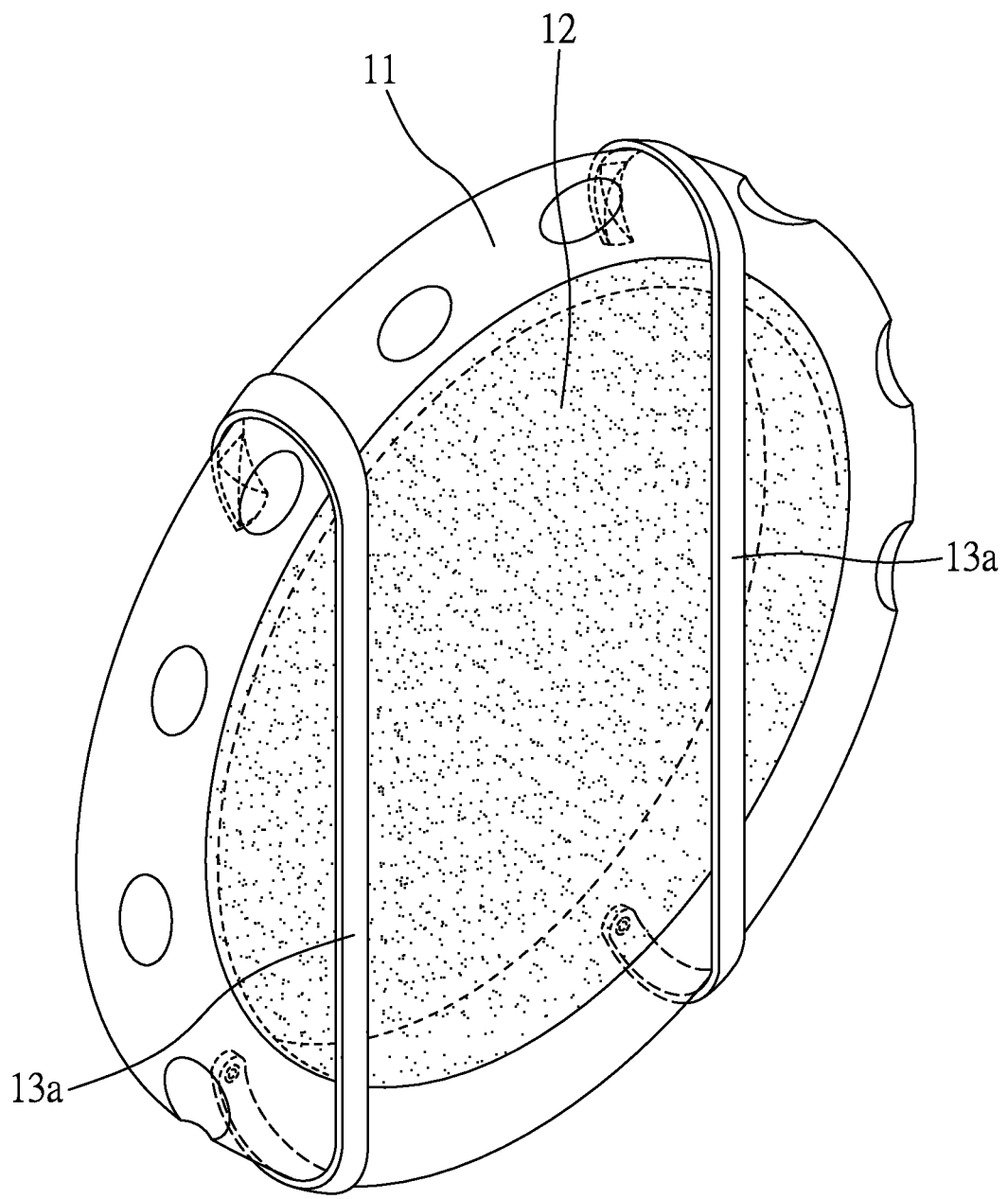
FIG. 2 is a perspective view showing the reading rack for use with vehicles according to the present invention.

Referring to FIGS. 1 and 2, a cutaway view and a perspective view of a preferred embodiment of the reading rack for use with vehicles of the present invention is depicted. As shown, the reading rack for use with vehicles at least includes a sheath member 11 coupled to the steering wheel of the vehicle 10, the sheath member being a ring shape and the inward side thereof is formed with an opening 110 adapted to cover the surface of the steering wheel 10; a bottom member 12 disposed on the sheath member 11, the bottom member being a textile cloth, a synthetic leather, an animal skin, an adhesive tape, a netting layer or an adhesive layer; and a pressing member 13a disposed on the sheath member 11 such as an elastic cord.

Figure 3:
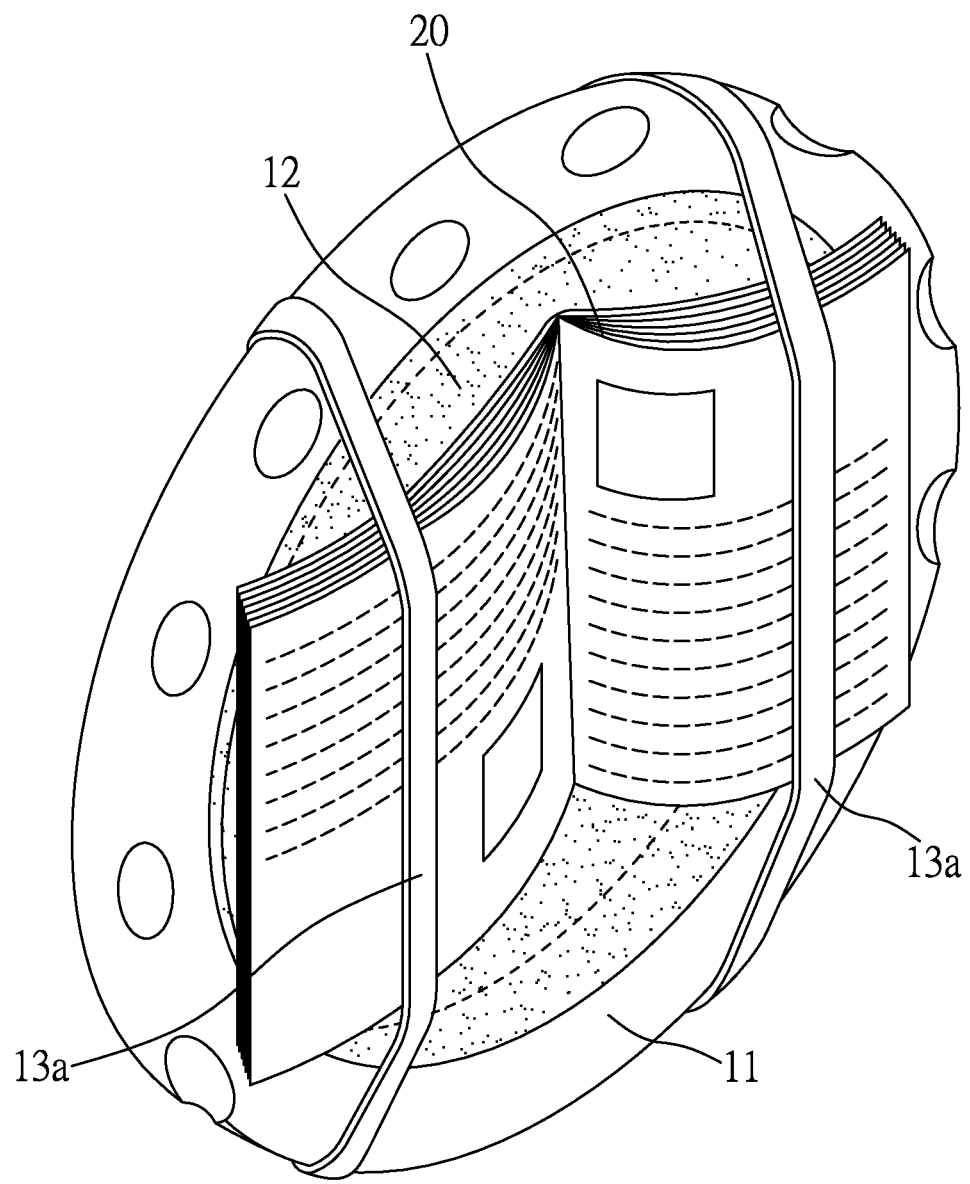
FIG. 3 is a perspective view showing the pressing member of a first embodiment of the reading rack for use with vehicles according to the present invention.

Referring to FIG. 3, an open readable item 20 such as a newspaper, a magazine, or a travel guide is placed between the bottom member 12 and the pressing member 13a and is pressed by the pressing member 13a, for example, a pair of elastic cords on each side of the wheel, thereby fastening the article 20 onto the steering wheel 10.

Figure 4A:
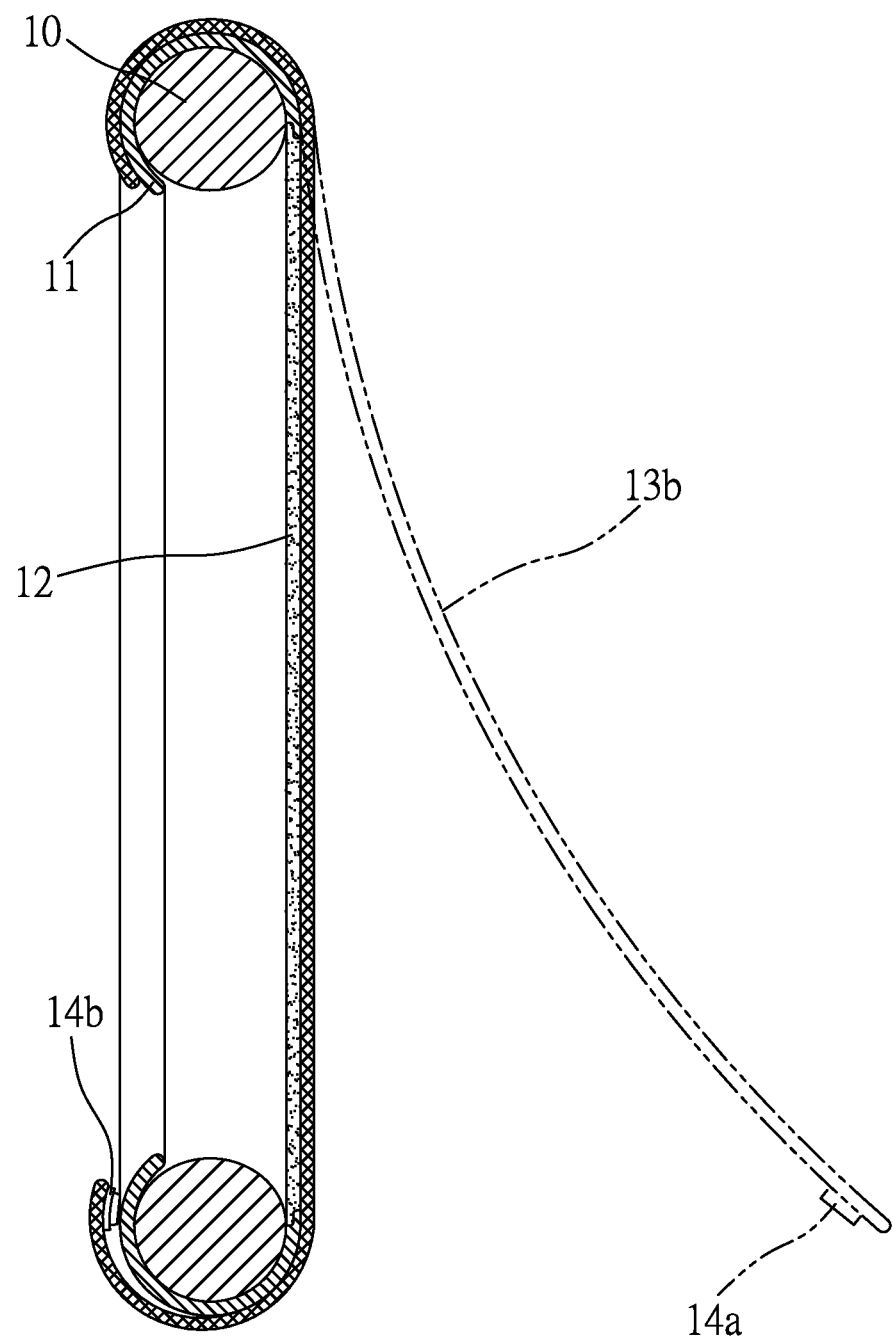
FIGS. 4A and 4B are, respectively, a side view and a front view showing the pressing member of a second embodiment of the reading rack for use with vehicles according to the present invention.
Figure 4B:
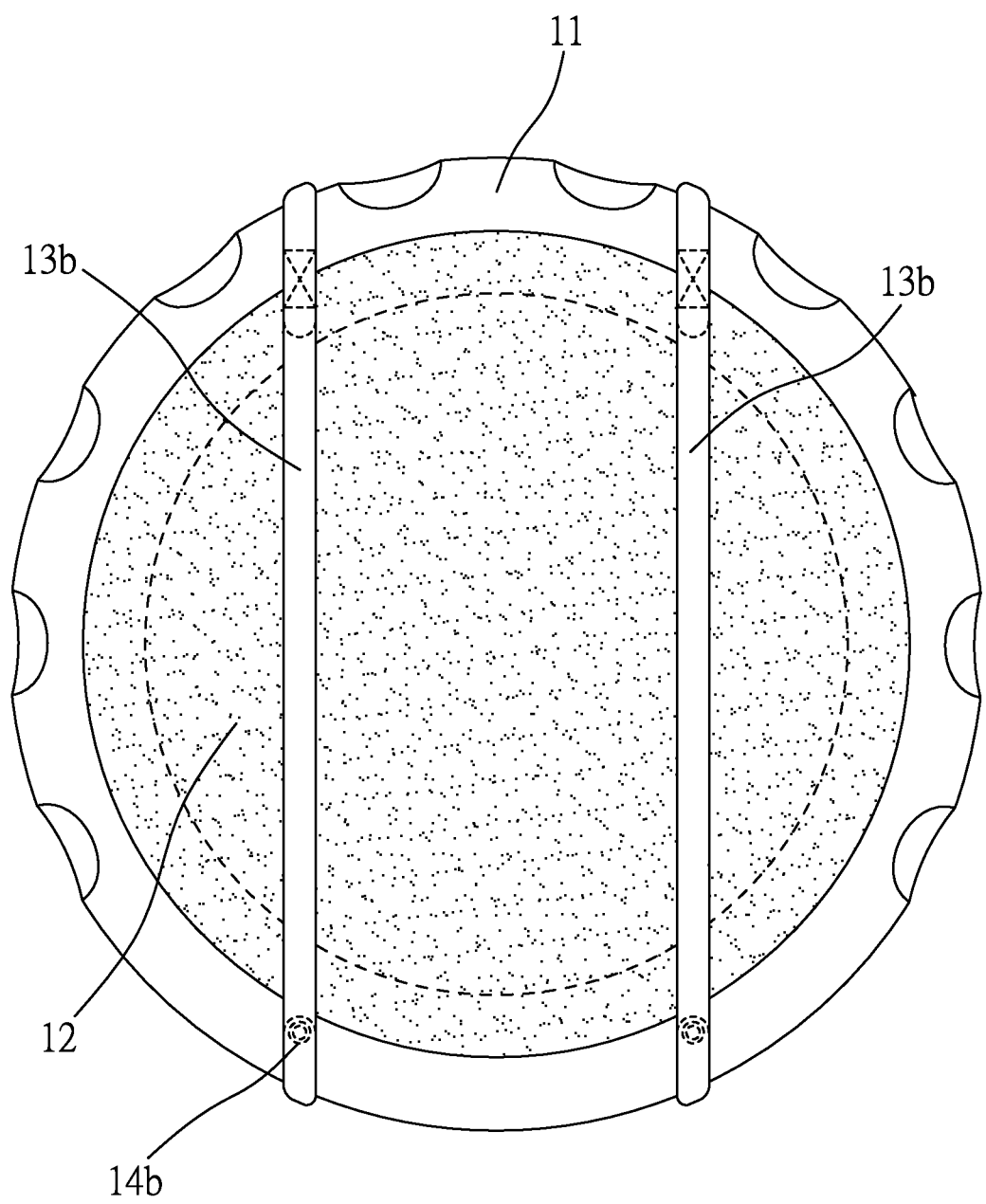

FIGS. 4A and 4B illustrate another embodiment of the pressing member utilizing a buckle 13b, one end of the buckle 13b being affixed to the sheath member 11, while the other end of the buckle 13b is provided with a first fixing member 14a which corresponds to a second fixing member 14b formed on the sheath member 11. The first and second fixing members 14a, 14b can be a pair of matched male and female buttons or a hook-and-loop fastener, allowing the buckle 13b to fasten and release the article 20 by means of the coupling of the first and second fixing members 14a, 14b.

Figure 5:
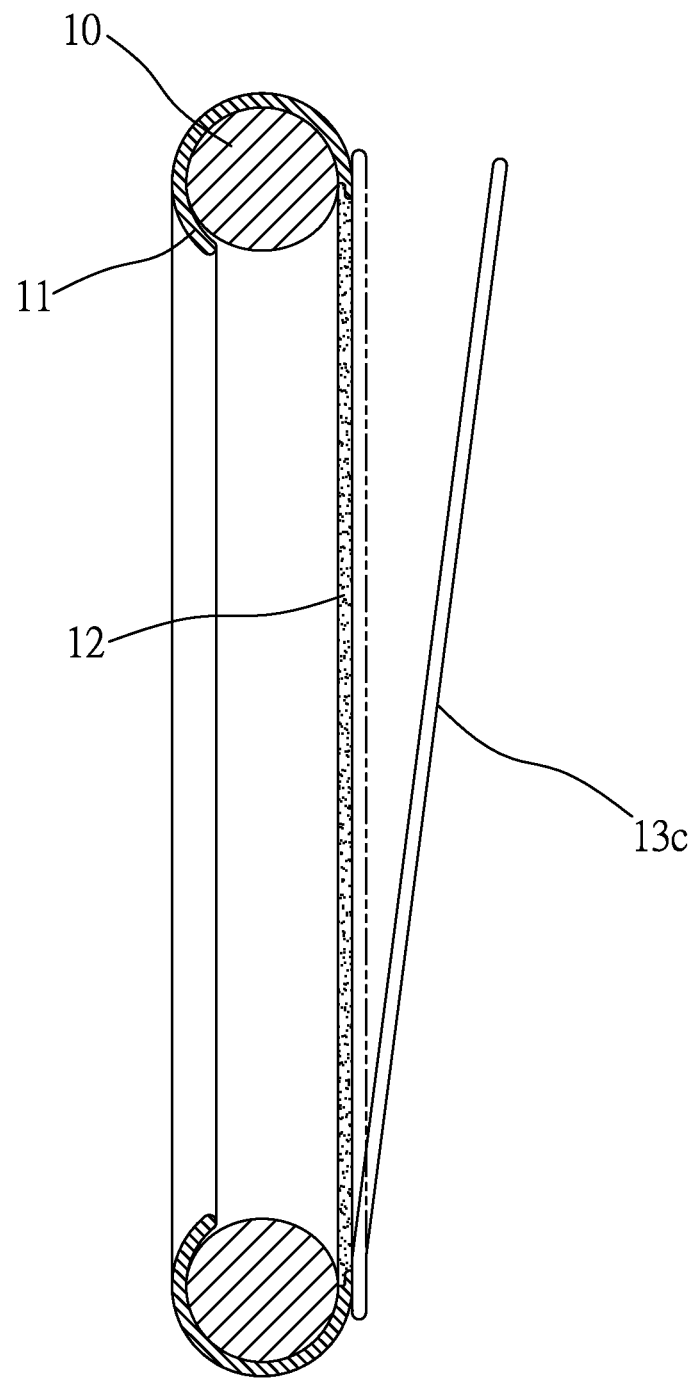
FIG. 5 is a side view showing the pressing member of a third embodiment of the reading rack for use with vehicles according to the present invention.

FIG. 5 illustrates another embodiment of the pressing member which is a bendable elastic pressing rod 13c, one end of the elastic pressing rod 13c being affixed to the sheath member 11, while the other end of the elastic pressing rod 13c can be opened to clip an article 20 by means of the elasticity of the elastic pressing rod 13c.

Figure 6A:
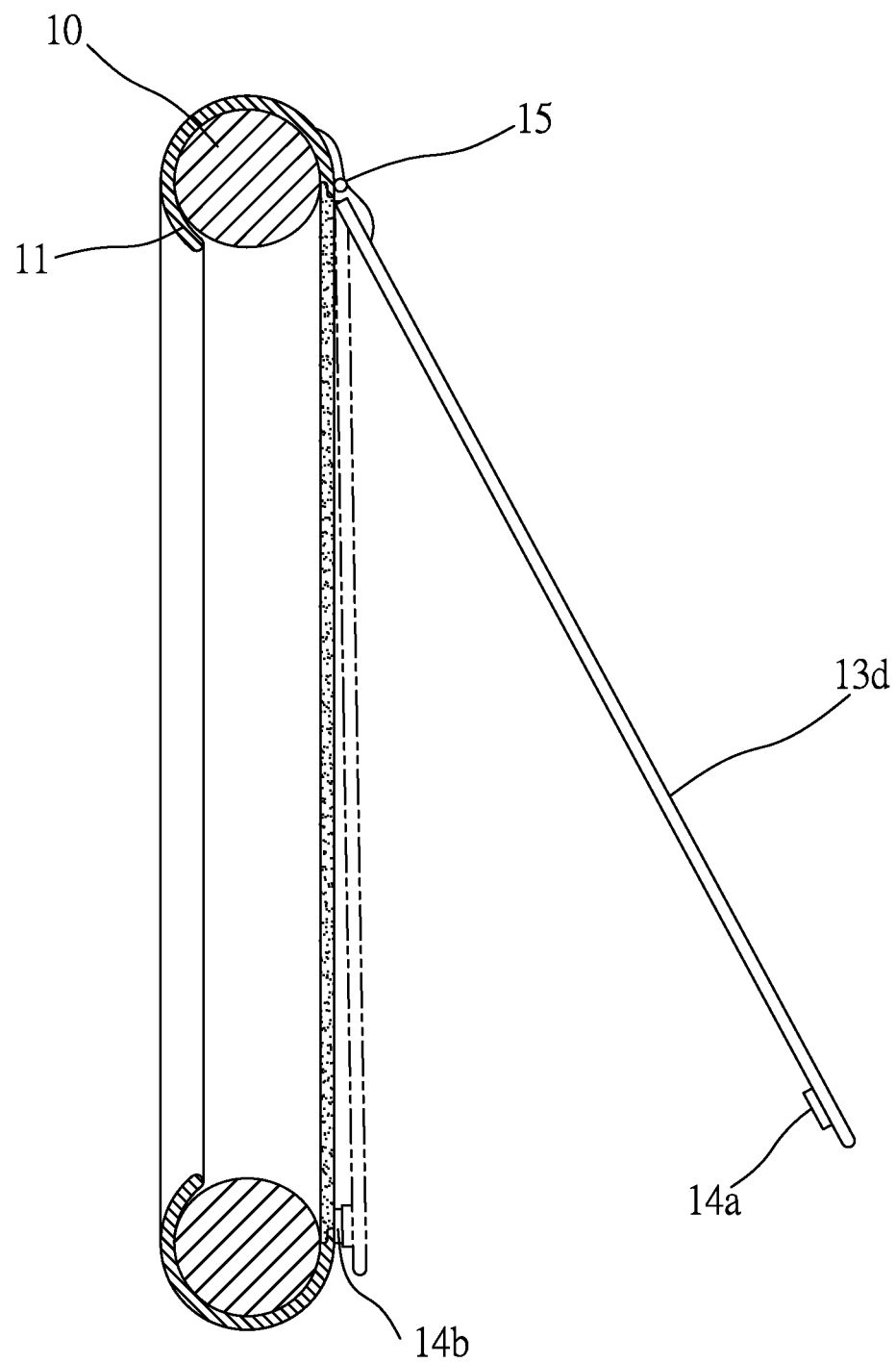
FIGS. 6A and 6B are, respectively, a side view and a front view showing the pressing member of a fourth embodiment of the reading rack for use with vehicles according to the present invention.
Figure 6B:
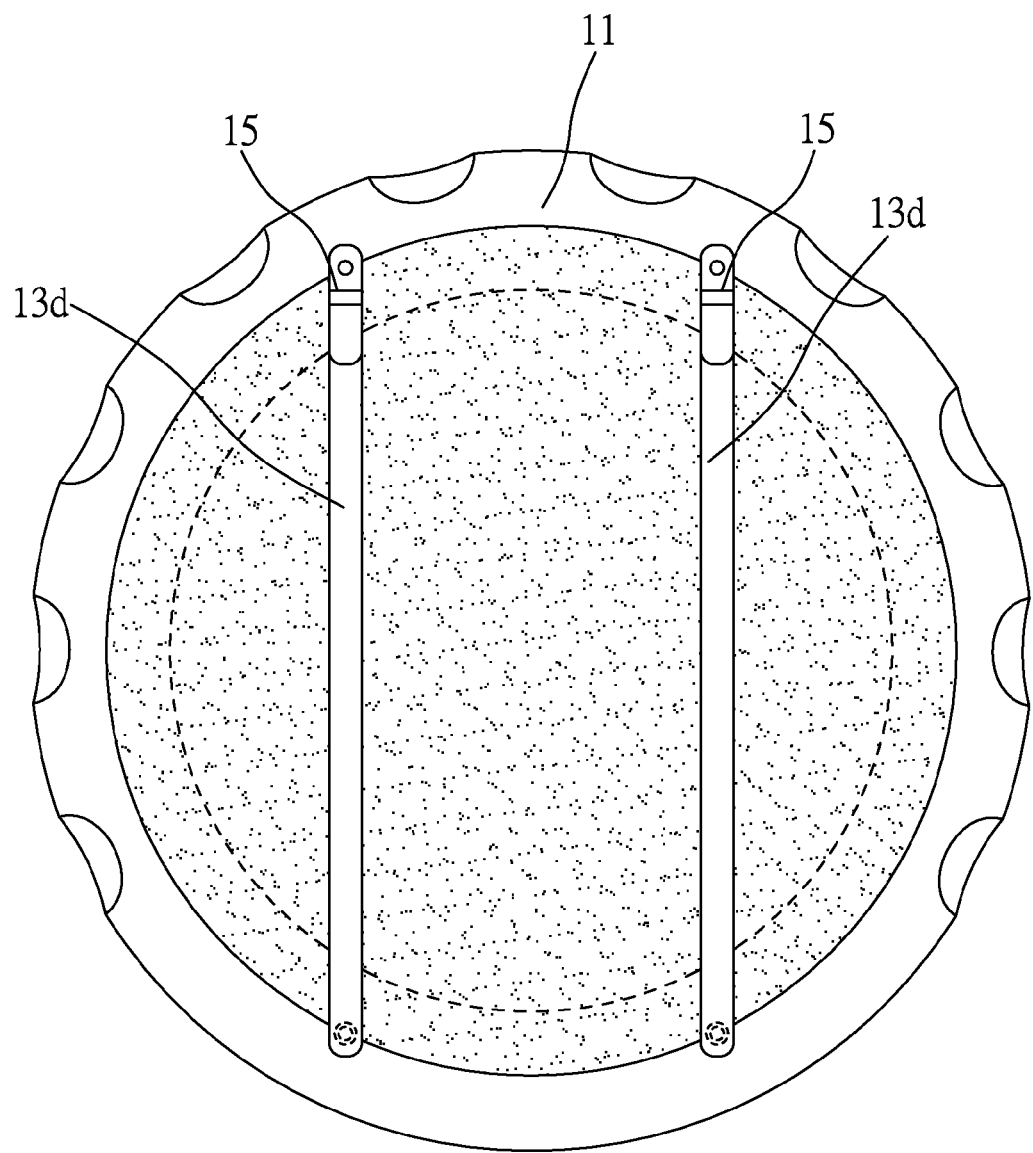

FIGS. 6A and 6B illustrate another embodiment of the pressing member which is a pressing stick 13d that is a rigid rod, one end of the pressing stick 13d being fixed to the sheath member 11 by means of a rotating element 15, the other end of the pressing stick 13d being provided with a first fixing member 14a while the sheath member 11 is provided with a second fixing member 14b corresponding to the first fixing member 14a. The first and second fixing members 14a, 14b can be a pair of matched male and female buttons or a hook-and-loop fastener, allowing the pressing rod 13d to release and fasten the article 20 by means of the coupling of the first and second fixing members 14a, 14b.

Figure 7:
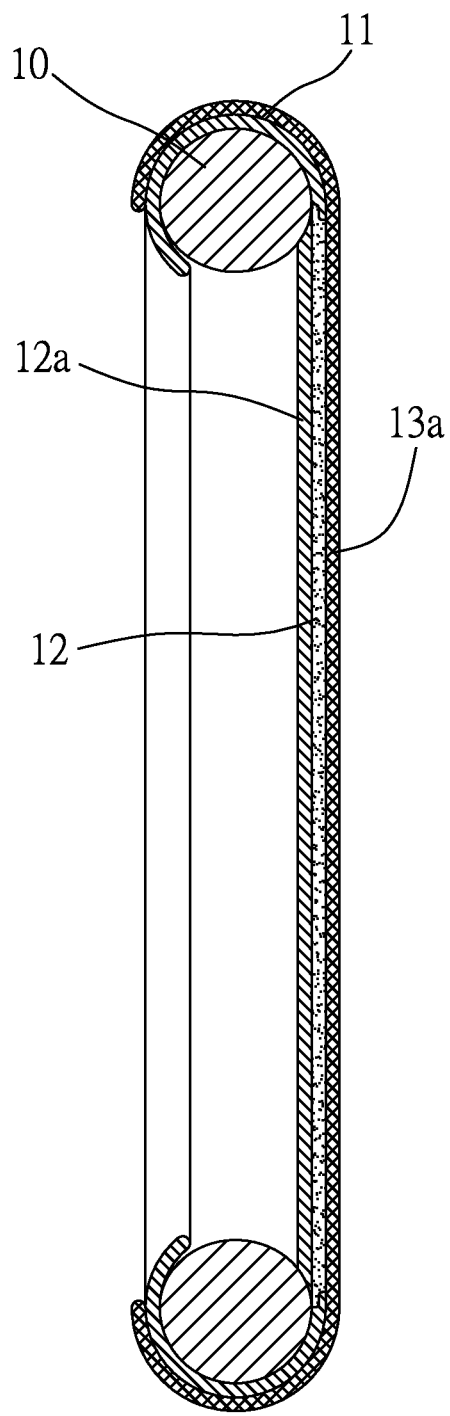
FIG. 7 is a cutaway view of another embodiment of the reading rack for use with vehicles according to the present invention.

Referring to FIG. 7, a bottom member 12 with of a hard layer 12a is illustrated, the hard layer 12a being provided to reinforce and support the bottom member 12.

Figure 8A:
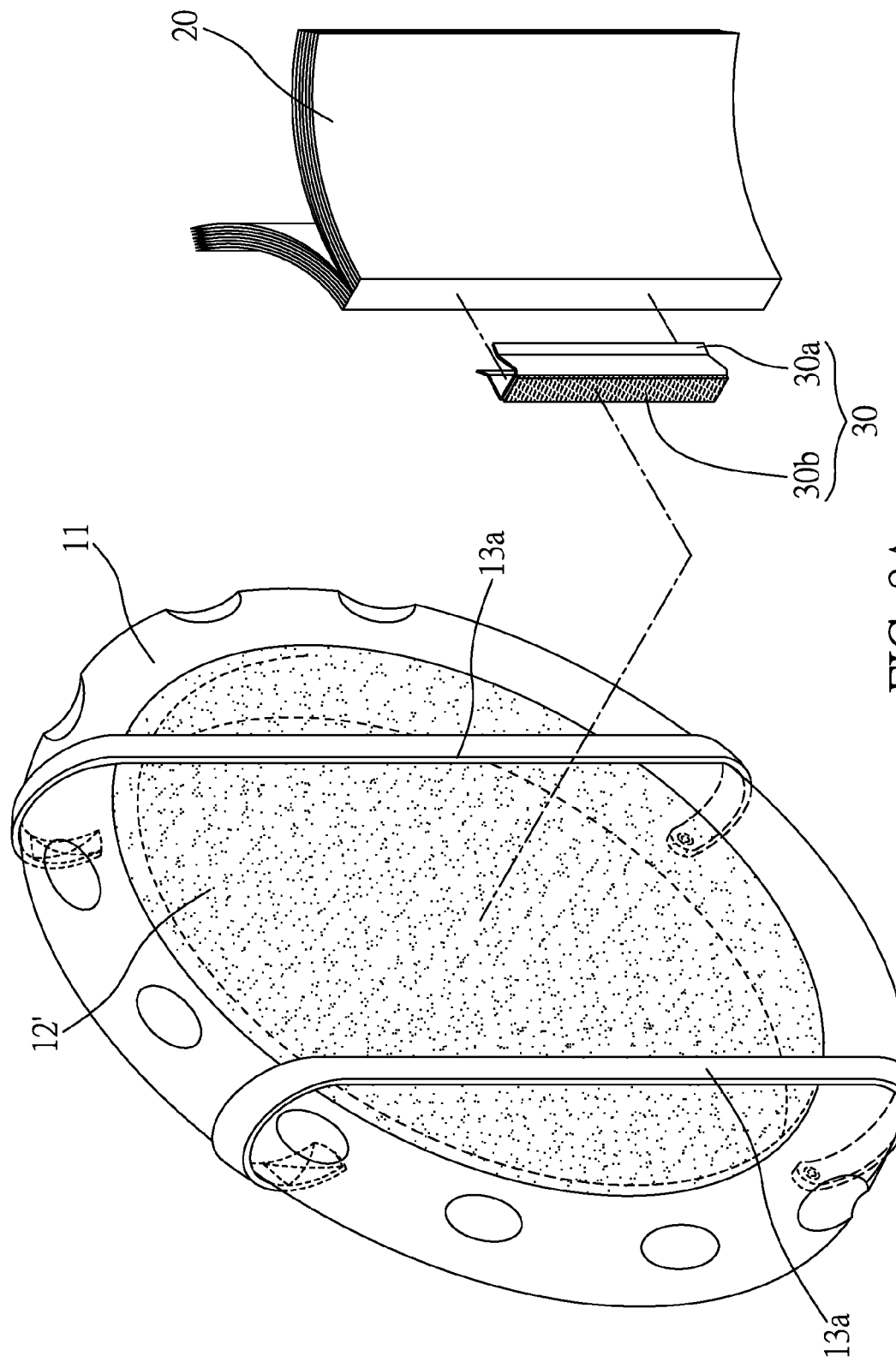
FIG. 8A is a perspective exploded view showing the holding member of the reading rack for use with vehicles holding an article according to the present invention.

Referring to FIG. 8A, the foregoing bottom member can be an retaining layer 12'. The invention can further comprise a holding member 30 having a clipping portion 30a and a mating portion 30b, wherein the clipping portion 30a is used to clip an article 20, and the retaining layer 12' and the mating portion 30b of the holding member 30 can be a hook-and-loop fastener, thereby affixing the article 20 to the retaining layer 12' by means of the holding member 30, so as to securely clip an article 20 having thicker volume and heavier weight.

Figure 8B:
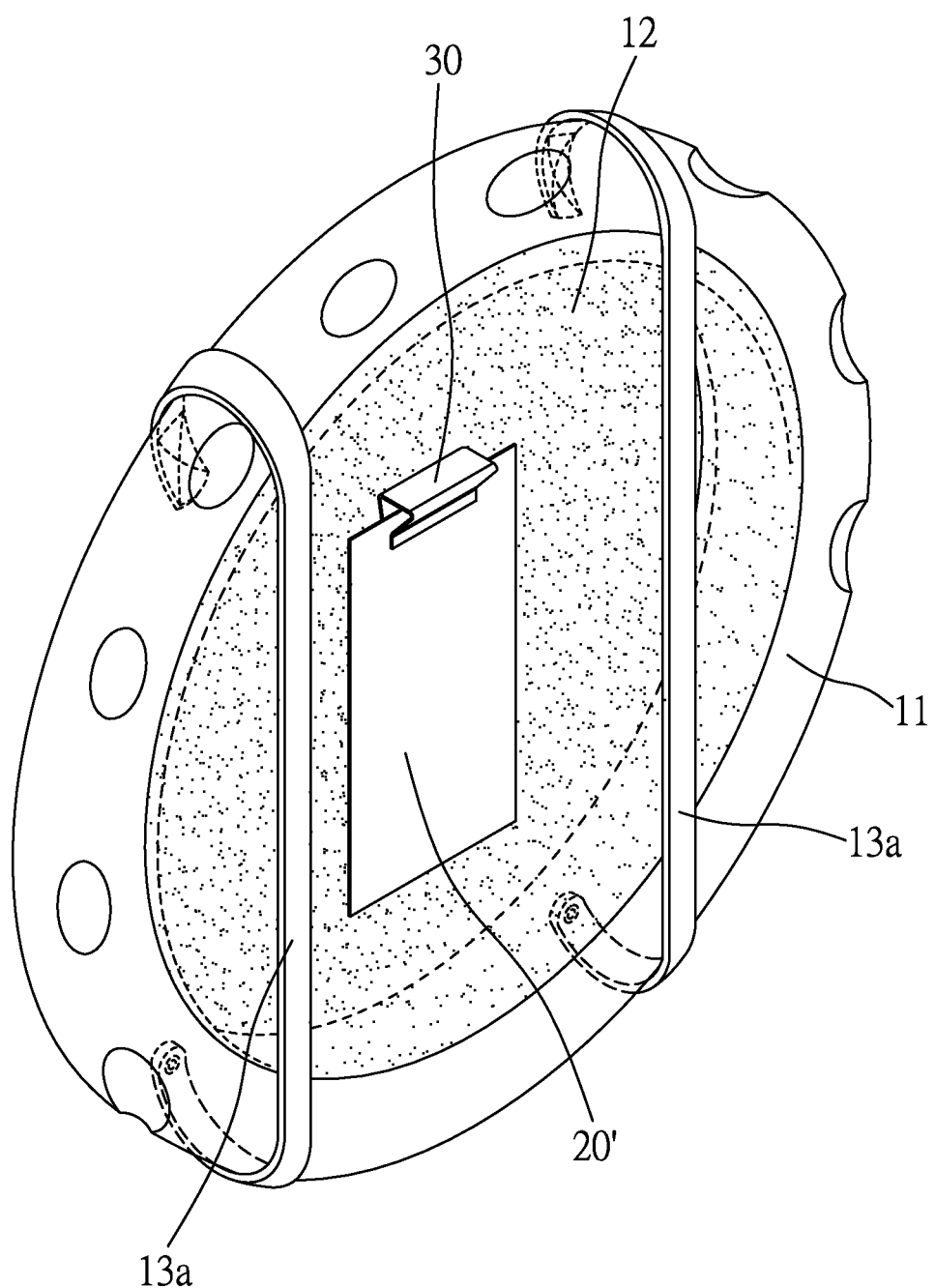
FIG. 8B is a perspective view showing the holding member of the reading rack for use with vehicles holding a piece of paper according to the present invention.

Referring to FIG. 8B, the holding member 30 can be used to directly clip and affix an article 20' to the retaining layer 12', such an article being a small note, a freeway ticket, a parking card and so on. In addition, the holding member 30 can have variations so as to be used to easily affix ornaments to the retaining layer 12'.

In summary, the reading rack for use with vehicle of the invention is characterized by clipping reading material on to the steering wheel of a vehicle, especially for reading convenience during stopovers, thereby eliminating the inconvenience incurred from having to hold an article or a map by hand and keeping an appropriate focal distance for the eyes of the user. Accordingly, the present invention offers advantages in that it can help increase the efficiency, safety, and convenience of operating and occupying a vehicle.

The aforementioned examples are only exemplary preferred embodiments of the present invention. The scope of the claims as stated below should be accorded the broadest interpretation so as to encompass various modifications and similar arrangements made to the herein described invention that fall within the spirit of the basic principles and technology of the present invention.

What is claimed is:

1. A reading rack for use with vehicles, comprising:
   a sheath member adapted to encapsulate a steering wheel of a vehicle and fasten to a surface of the steering wheel, wherein the sheath member has a cross-sectional profile conformal to that of the steering wheel and a male button is formed on the sheath member;
   a bottom member adapted to connect and fasten to the sheath member;
   a pressing member coupled with the sheath member and located at an upper surface of the sheath member, thereby allowing one or more pages of a note/article/book to be placed above the bottom member and underneath the pressing member; and
   a holding member including a base detachably connected to the bottom member, and a pair of elongated clipping arms extending from the base, protruding out from the bottom member, and forming an elongated clipping groove configured to receive a spine of a book,
   wherein one end of the pressing member is affixed to the sheath member while the other end thereof is provided with a female button that corresponds to the male button formed on the sheath member, and
   wherein the bottom member and the base of the holding member are coupled by a hook-and-loop fastener.

2. The reading rack for use with vehicles of claim 1, wherein the bottom member is a textile cloth, a synthetic leather, an adhesive tape, a netting layer or an adhesive layer.

3. The reading rack for use with vehicles of claim 1, wherein the bottom member further comprises a hard layer.

4. The reading rack for use with vehicles of claim 1, wherein the clipping arms is adapted to clip one or more pages of a note/article/book and couple with a surface of the bottom member by the base.

5. The reading rack for use with vehicles of claim 1, wherein the pressing member is selected from spacing buckles and spacing pressing sticks.

6. The reading rack for use with vehicles of claim 5, wherein one end of each of the buckles is affixed to the sheath member while the other end thereof is provided with the female button that corresponds to a second button formed on the sheath member.

7. The reading rack for use with vehicles of claim 5, wherein each of the pressing sticks is a rigid rod, one end thereof being fixed to the sheath member by means of a rotating element, and the other end thereof having the female button that corresponds to the male button formed on the sheath member.

* * * * *